United States Patent
Shumway et al.

(10) Patent No.: US 11,021,640 B2
(45) Date of Patent: Jun. 1, 2021

(54) HYDROPHOBICALLY-TREATED PARTICULATES FOR IMPROVED FLUID RHEOLOGY

(71) Applicant: Halliburton Energy Services, Inc., Houston, TX (US)

(72) Inventors: William Walter Shumway, Spring, TX (US); Jessica Paola Ramirez Angulo, Kingwood, TX (US); Kay Ann Galindo, Mongomery, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 73 days.

(21) Appl. No.: 15/772,883

(22) PCT Filed: Dec. 30, 2015

(86) PCT No.: PCT/US2015/068109
§ 371 (c)(1),
(2) Date: May 2, 2018

(87) PCT Pub. No.: WO2017/116440
PCT Pub. Date: Jul. 6, 2017

(65) Prior Publication Data
US 2018/0320049 A1    Nov. 8, 2018

(51) Int. Cl.
*E21B 21/00*   (2006.01)
*C09K 8/06*    (2006.01)
(Continued)

(52) U.S. Cl.
CPC .............. *C09K 8/06* (2013.01); *C09K 8/665* (2013.01); *C09K 8/80* (2013.01); *C09K 8/805* (2013.01);
(Continued)

(58) Field of Classification Search
None
See application file for complete search history.

(56) References Cited

U.S. PATENT DOCUMENTS 5,962,375 A  * 10/1999  Sawdon ................... C09K 8/16
                                                         507/140
6,737,384 B2    5/2004  Rayborn
(Continued)

FOREIGN PATENT DOCUMENTS

WO       92/02587 A1     2/1992
WO    2014/133537 A1     9/2014

OTHER PUBLICATIONS

International Preliminary Report on Patentability issued in related PCT Application No. PCT/US2015/068109 dated Jul. 12, 2018 (8 pages).

(Continued)

*Primary Examiner* — Anuradha Ahuja
(74) *Attorney, Agent, or Firm* — Tenley Krueger; Baker Botts L.L.P.

(57) ABSTRACT

Systems and methods for treating subterranean formations using particulates treated with hydrophobizing agents in aqueous base fluid are provided. In one embodiment, the methods comprise: providing a treatment fluid comprising an aqueous base fluid and at least one particulate treated with one or more hydrophobizing agents; introducing the into a wellbore penetrating at least a portion of a subterranean formation; and using the treatment fluid to drill a portion of the wellbore.

9 Claims, 1 Drawing Sheet

(51) Int. Cl.
*C09K 8/80* (2006.01)
*E21B 21/06* (2006.01)
*C09K 8/66* (2006.01)
*E21B 43/267* (2006.01)

(52) U.S. Cl.
CPC .......... *E21B 21/003* (2013.01); *E21B 21/062* (2013.01); *E21B 43/267* (2013.01)

(56) References Cited

U.S. PATENT DOCUMENTS

| | | | | |
|---|---|---|---|---|
| 6,884,760 | B1* | 4/2005 | Brand | C09K 8/08 507/111 |
| 2004/0094300 | A1* | 5/2004 | Sullivan | C09K 8/52 166/308.1 |
| 2006/0257643 | A1 | 11/2006 | Bierger | |
| 2007/0079965 | A1 | 4/2007 | Nguyen et al. | |
| 2007/0293402 | A1* | 12/2007 | Ballard | C09K 8/03 507/129 |
| 2008/0269079 | A1 | 10/2008 | Ballard | |
| 2011/0077175 | A1 | 3/2011 | James et al. | |
| 2013/0303412 | A1* | 11/2013 | Luyster | C09K 8/512 507/236 |
| 2014/0135237 | A1 | 5/2014 | Villarreal, Jr. et al. | |
| 2014/0190700 | A1 | 7/2014 | Tang et al. | |
| 2014/0209307 | A1* | 7/2014 | Jamison | E21B 43/16 166/292 |
| 2014/0228258 | A1* | 8/2014 | Mahoney | C09K 8/805 507/219 |
| 2015/0027699 | A1* | 1/2015 | Loiseau | C09K 8/92 166/278 |

OTHER PUBLICATIONS

International Search Report and Written Opinion issued in related PCT Application No. PCT/US2015/068109 dated Aug. 30, 2016, 11 pages.
Wikipedia entry for "dilatant" fluid, retrieved from https://en.wikipedia.org/w/index.php?title=Dilatant&oldid=924521086 Nov. 4, 2019 (9 pages).

* cited by examiner

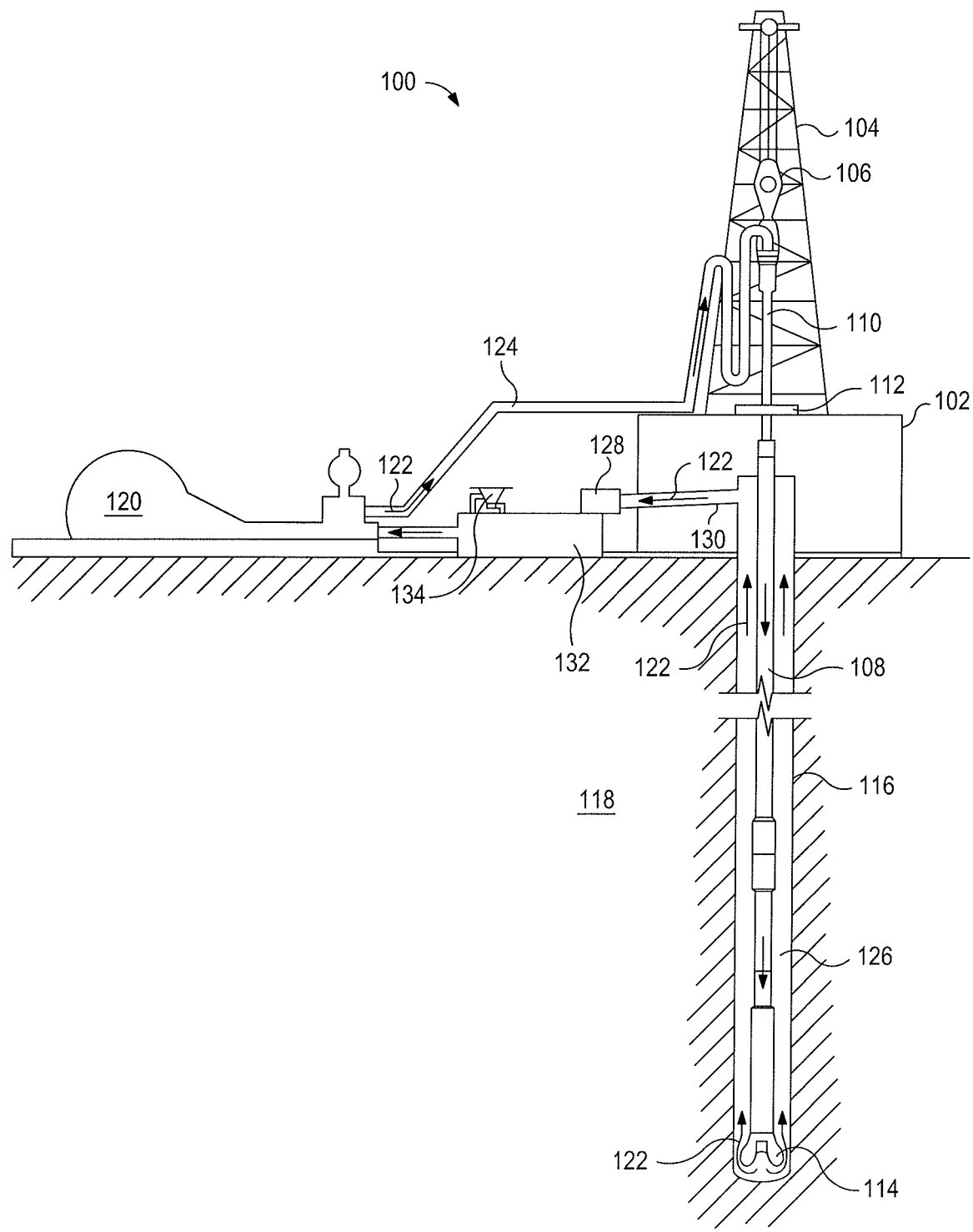

HYDROPHOBICALLY-TREATED PARTICULATES FOR IMPROVED FLUID RHEOLOGY

CROSS-REFERENCE TO RELATED APPLICATION

The present application is a U.S. National Stage Application of International Application No. PCT/US2015/068109 filed Dec. 30, 2015, which is incorporated herein by reference in its entirety for all purposes.

BACKGROUND

The present disclosure relates to systems and methods for treating subterranean formations. Treatment fluids can be used in a variety of subterranean treatment operations. As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid. Illustrative treatment operations can include, for example, drilling operations, fracturing operations, gravel packing operations, acidizing operations, scale dissolution and removal, consolidation operations, and the like.

For example, rotary drilling methods employing drilling apparatus having a drill bit and drill stem have long been used to drill wellbores or boreholes in subterranean formations. Drilling fluids or muds are commonly circulated in the well during such drilling to serve a number of functions, including cooling and lubricating the drilling apparatus, counterbalancing the subterranean formation pressure encountered, and removing drill cuttings from the formation out of the wellbore. In removing drill cuttings from the well, drilling fluids suspend the cuttings and carry them to the surface for removal from the well.

The rheology of a drilling fluid may play an important role in drilling oil and gas wells. If the rheology of the fluid is not appropriate for the formation and physical conditions of the well, the drilling operations may be spoiled with drilling problems such as lost circulation, poor hole cleaning, fracturing phenomena of the crossed formations, and stuck pipe, for example. Some of the main drilling parameters involved are cutting, lifting and hole cleaning efficiencies (resulting both from variation of the velocity profile of the fluid flow, and from variation of the rheological parameters), and the pressure spatial distribution along the well profile. It is also often desirable for the drilling fluid to be able to transport cuttings up to the well surface without any restriction in any of the existing annulus sections. Such unrestricted transport depends on many parameters including the geometry of the annulus section, the rotation velocity of the drill string, the rate of drill bit penetration into the formation, the flow rate of the drilling fluid, the cuttings characteristics, and above all the rheology of the used drilling fluid. It is also often desirable to keep a constant limit on the concentration values of the cuttings during the cuttings transport to avoid solid particle deposition inside the well, risking problems of borehole occlusion, bit balling, and drill string sticking during the drilling process.

BRIEF DESCRIPTION OF THE DRAWINGS

These drawings illustrate certain aspects of some of the embodiments of the present disclosure, and should not be used to limit or define the claims.

FIG. 1 is a diagram illustrating an example of a well bore drilling assembly that may be used in accordance with certain embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

The present disclosure relates to systems and methods for treating subterranean formations. More particularly, the present disclosure relates to systems and methods for using aqueous fluids comprising particulates treated with hydrophobizing agents that may improve the rheological properties of various treatment fluids used in treating subterranean formations.

The present disclosure provides methods and systems for treating subterranean formations using particulates treated with (e.g., at least partially coated with) hydrophobizing agents in an aqueous base fluid. In certain embodiments, the methods of the present disclosure comprise using the aqueous base fluid with particulates coated in hydrophobizing agents as a treatment fluid and placing it in a wellbore that penetrates at least a portion of a subterranean formation. In certain embodiments, the methods of the present disclosure comprise providing a treatment fluid comprising a proppant coated in hydrophobizing agents in an aqueous base fluid, and the proppant propping one or more fractures. In certain embodiments, the methods of the present disclosure comprise providing a treatment fluid comprising a bridging agent in an aqueous base fluid, and the bridging agent depositing a as a filter cake along the walls of the subterranean formation.

Among the many potential advantages to the methods and compositions of the present disclosure, only some of which are alluded to herein, the methods, compositions, and systems of the present disclosure may provide improved rheological properties of treatment, fracturing, drilling, and drill-in fluids. Improved rheological properties may include but are not limited to: lower plastic viscosity (PV), lower overall viscosity, higher low shear rheology, lower high shear rheology, lower HTHP fluid loss, improved lubricity, improved particulate suspension capacity, and greater gel strength. In certain embodiments, the methods and compositions of the present disclosure may achieve these improved rheological properties without the addition of other types of rheology-modifying additives such as polymeric gelling agents, other polymers, surfactants, clays, and the like.

The treatment fluids used in the methods and systems of the present disclosure may comprise any aqueous base fluid known in the art. The term "base fluid" refers to the major component of the fluid (as opposed to components dissolved and/or suspended therein), and does not indicate any particular condition or property of that fluid such as its mass, amount, pH, etc. Aqueous fluids that may be suitable for use in the methods and systems of the present disclosure may comprise water from any source. Such aqueous fluids may comprise fresh water, salt water (e.g., water containing one or more salts dissolved therein), brine, seawater, or any combination thereof. In most embodiments of the present disclosure, the aqueous fluids comprise one or more ionic species, such as those formed by salts dissolved in water. For example, seawater and/or produced water (e.g., brine) may comprise a variety of monovalent and divalent cationic species dissolved therein. In certain embodiments, the density of the aqueous fluid can be adjusted, among other purposes, to provide additional particulate transport and suspension in the compositions of the present disclosure. In certain embodiments, the pH of the aqueous fluid may be adjusted (e.g., by a buffer or other pH adjusting agent) to a specific level, which may depend on, among other factors, the types of viscosifying agents, acids, and other additives included in the fluid. One of ordinary skill in the art, with the benefit of this disclosure, will recognize when such density and/or pH adjustments are appropriate. In certain embodiments, the fracturing fluids may comprise a mixture of one or more fluids and/or gases, including but not limited to emulsions, foams, and the like.

The treatment fluids used in certain embodiments this disclosure include particulates (such as proppant particulates, bridging agents, or gravel particulates) suitable for use in subterranean applications or that are otherwise compatible with the treatment fluid in which they are used. Particulates that may be suitable for use in the present disclosure may comprise any material suitable for use in subterranean operations. The particulates used in this disclosure may be any bridging agents, proppants or any other particulates known in the art. For example, particulate bridging agents may be used to bridge across the pore throat or fractures of exposed rock thereby building a filter cake to prevent loss of whole mud or excessive filtrate. In another example, proppant particulates may be used in conjunction with hydraulic fracturing to prevent the fractures from fully closing upon the release of hydraulic pressure, forming conductive channels through which fluids may flow to the wellbore.

Particulate materials that may be suitable for use in certain embodiments of the present disclosure include, but are not limited to, carbonate compounds (e.g., calcium carbonate, zinc carbonate), magnesium compounds (e.g., magnesium oxide, magnesium tartrate, magnesium citrate), zinc oxide, calcium compounds (e.g., calcium sulfate, calcium citrate, calcium succinate, calcium tartrate, calcium maleate silica), bismuth citrate, sand, silica, bauxite, ceramic materials, glass materials, polymer materials, BARACARB® (available from Halliburton Energy Services, Inc.), Teflon® materials, nut shell pieces, fruit pit pieces, seed shell pieces, cured resinous particulates comprising seed shell pieces, cured resinous particulates comprising nut shell pieces, cured resinous particulates comprising fruit pit pieces, other resinous material particulates, wood, composite particulates, and any combination thereof. Composite particulates that may be suitable for use in certain embodiments of the present disclosure may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and any combination thereof.

It should be understood that the term "particulate," as used in this disclosure, includes all known shapes of materials, including substantially spherical materials, fibrous materials, polygonal materials (such as cubic materials), and mixtures thereof. Moreover, fibrous materials, that may or may not be used to bear the pressure of a closed fracture, are often included in fracturing and sand control treatments. In certain embodiments, the particulates included in the treatment fluids of some embodiments of the present disclosure may be at least partially coated with any suitable resin or tackifying agent known to those of ordinary skill in the art.

The hydrophobizing agents used in the methods and compositions of the present disclosure may comprise any compound capable of rendering a surface hydrophobic. In certain embodiments, the hydrophobizing agent may accomplish this by adsorbing onto, binding to, or reacting with the hydrophilic surface. Examples of compounds that may be suitable as hydrophobizing agents in certain embodiments of the present disclosure include, but are not limited to, polymers having one or more pendant acid moieties, long chain fatty acids (e.g., stearic acid, oleic acid, lauric acid, caproic acid), organic acids, organosilanes, silicone, silica, silanes, titania, zirconia, gold, thiols, nano-materials (e.g., nano-scale materials comprising silica, alumina, gold, silver, copper, or other transition metals), functionalized carbon-based nano-materials (e.g., graphene oxides, COOH-terminated carbon nanotubes, and graphenes), carbohydrates, proteins, lipids, nucleic acids, alumina, and any combination thereof. The fatty acids and/or organic acids used in certain embodiments of the present disclosure may include carbon chains (e.g., alkyl groups, alkene groups, alkyne groups, or a combination thereof, each of which may be branched, unbranched, or cyclic) of any suitable length. In certain embodiments, the fatty acids and/or organic acids may include chains of 3 to 36 carbon atoms. In certain embodiments, the fatty acids and/or organic acids may include chains of 12 to 18 carbon atoms. In certain embodiments, the fatty acids and/or organic acids may include chains of 16 to 18 carbon atoms.

In certain embodiments, certain of these materials may be deposited on a surface of a particulate using any suitable means known in the art, e.g., a sol-gel process. In certain embodiments, such materials may be deposited onto a surface of the particulate to at least partially (or entirely) coat the surface of the particulate. In certain embodiments, certain of these materials may form at least a partial monolayer on the surface to which they are applied. Unlike certain other types of coatings, the coating of the hydrophobizing agent in certain embodiments of the present disclosure may not be expandable (e.g., swellable when contacted by an actuating fluid.)

In certain embodiments, the treatment fluids used in the methods and systems of the present disclosure optionally may comprise any number of additional additives. Examples of such additional additives include, but are not limited to, salts, surfactants, acids, additional particulates, diverting agents, fluid loss control additives, gas, nitrogen, carbon dioxide, surface modifying agents, tackifying agents, foamers, corrosion inhibitors, scale inhibitors, catalysts, clay control agents, biocides, friction reducers, antifoam agents, flocculants, additional $H_2S$ scavengers, $CO_2$ scavengers, oxygen scavengers, lubricants, additional viscosifiers, breakers, weighting agents, relative permeability modifiers, resins, wetting agents, coating enhancement agents, filter cake removal agents, antifreeze agents (e.g., ethylene glycol), and the like. In certain embodiments, one or more of these additional additives (e.g., a crosslinking agent) may be added to the treatment fluid and/or activated after the viscosifying agent has been at least partially hydrated in the fluid. A person skilled in the art, with the benefit of this disclosure, will recognize the types of additives that may be included in the fluids of the present disclosure for a particular application.

The treatment fluids of the present disclosure may be prepared using any suitable method and/or equipment (e.g., blenders, mixers, stirrers, etc.) known in the art at any time prior to their use. The treatment fluids may be prepared at least in part at a well site or at an offsite location. In certain embodiments, the components of the treatment fluid may be metered directly into a base treatment fluid to form a treatment fluid. In certain embodiments, the base fluid may be mixed with the components of the treatment fluid at a well site where the operation or treatment is conducted, either by batch mixing or continuous ("on-the-fly") mixing. The term "on-the-fly" is used herein to include methods of combining two or more components wherein a flowing stream of one element is continuously introduced into a flowing stream of another component so that the streams are combined and mixed while continuing to flow as a single stream as part of the on-going treatment. Such mixing can also be described as "real-time" mixing. In other embodiments, the treatment fluids of the present disclosure may be prepared, either in whole or in part, at an offsite location and transported to the site where the treatment or operation is conducted. In introducing a treatment fluid of the present disclosure into a portion of a subterranean formation, the components of the treatment fluid may be mixed together at the surface and introduced into the formation together, or one or more components may be introduced into the formation at the surface separately from other components such that the components mix or intermingle in a portion of the formation to form a treatment fluid. In either such case, the treatment fluid is deemed to be introduced into at least a portion of the subterranean formation for purposes of the present disclosure.

The present disclosure in some embodiments provides methods for using the treatment fluids to carry out a variety of subterranean treatments, including but not limited to, hydraulic fracturing treatments, acidizing treatments, drill-in operations, and drilling operations. For example, the methods and/or compositions of the present disclosure may be used in the course of drilling operations in which a well bore is drilled to penetrate a subterranean formation. In some embodiments, the treatment fluid of the present disclosure may be a drill-in fluid. In certain embodiments, the drill-in fluid may be used in the course of drilling operations in which the well bore is drilled to penetrate the pay zone or reservoir zone of a subterranean formation. In certain embodiments, the drill-in fluid may alternatively be used to perform a variety of treatment operations on the reservoir portion of the subterranean formation. In certain embodiments, the drill-in fluid comprises only components that are not damaging or at least minimally damaging to the formation. In certain embodiments, the drill-in fluid may contain only selected solid particulates of appropriate size and polymers. In certain embodiments, the drill-in fluid contains only additives essential for filtration control and carrying cuttings. In some embodiments, the treatment fluids of the present disclosure may be used in treating a portion of a subterranean formation, for example, in acidizing treatments such as matrix acidizing or fracture acidizing. In certain embodiments, a treatment fluid may be introduced into a subterranean formation. In some embodiments, the treatment fluid may be introduced into a well bore that penetrates a subterranean formation. In some embodiments, the treatment fluid may be introduced at a pressure sufficient to create or enhance one or more fractures within the subterranean formation (e.g., hydraulic fracturing).

In certain embodiments, the methods and compositions of the present disclosure may be used to form filter cakes in subterranean well bores (particularly long, horizontal well bores) to allow for more effective and/or uniform removal of the filter cakes, e.g., along the entire well bore. In certain embodiments, an acid and/or an acid generating component may be introduced into the formation, among other purposes, to degrade a filter cake and/or other undesired substances in the formation. In certain embodiments, the hydrophobizing agents of the present disclosure may serve to delay (or further delay) the reaction of the acid with the filter cake or other undesired substances. In other embodiments, a particulate bridging agent to be included in a treatment fluid (e.g., a drilling fluid) may be contacted with a hydrophobizing agent of the present disclosure such that the hydrophobizing agent is deposited (e.g., coated) on its surface, renders the surface of the particulate at least partially hydrophobic, and/or decreases the particulate's reactivity with acids before it is introduced into a well bore. When the particulate bridging agent is introduced into the well bore, it may form a portion of a filter cake that may be at least partially hydrophobic and/or less reactive with acids.

The particulate bridging agents used and/or present in certain embodiments of the present disclosure may comprise any particulate material that is capable of bridging over the pores in the surfaces of the formation or well bore such that a filter cake is deposited thereon. In certain embodiments, the bridging agent may be substantially insoluble in, for example, the drilling fluid or other treatment fluid in which it is used. Examples of materials that may be suitable as particulate bridging agents in certain embodiments of the present disclosure include, but are not limited to, carbonate compounds (e.g., calcium carbonate), magnesium compounds (e.g., magnesium oxide), manganese oxide, zinc oxide, zinc carbonate, calcium sulfate, magnesium citrate, calcium citrate, calcium succinate, calcium maleate, calcium tartrate, magnesium tartrate, bismuth citrate, ceramic materials, resinous materials, polymeric materials, and any combination or mixture thereof. The particulate bridging agent may be present in the drilling or treatment fluid in an amount sufficient to create an efficient filter cake. As referred to herein, the term "efficient filter cake" will be understood to mean a filter cake comprising an amount of material required to provide a desired level of fluid loss control. In certain embodiments, the bridging agent may be present in the drilling or treatment fluid in an amount ranging from about 0.1% to about 40% by weight. In certain embodiments, the bridging agent may be present in the drilling or treatment fluid in an amount ranging from about 0.1 to 100 pounds per gallon. In certain embodiments, the bridging agent may be present in the drilling or treatment fluid in an amount in the range of from about 3% to about 20% by weight. Generally, the particle size of the particulate bridging agent used is determined by the pore throat size of the formation in which it will be used. In certain embodiments, the particulate bridging agents may have a particle size in the range of from about 1 micron to about 600 microns. In certain embodiments, the particulate bridging particle size is in the range of from about 1 to about 200 microns.

The drilling fluids of the present disclosure may be provided and/or introduced into the well bore or used to drill at least a portion of a well bore in a subterranean formation using any method or equipment known in the art. In certain embodiments, a drilling fluid of the present disclosure may be circulated in the well bore using the same types of pumping systems and equipment at the surface that are used to introduce conventional drilling fluids and/or other treatment fluids or additives into a well bore penetrating at least a portion of the subterranean formation.

In certain embodiments, the particulates coated or otherwise treated with hydrophobizing agents enhance the rheological properties of the treatment fluid. The fluid may exhibit improved rheological properties, which include but are not limited to: lower plastic viscosity (PV), lower overall viscosity, higher low shear rheology, lower high shear rheology, lower HTHP fluid loss, improved lubricity, and greater gel strength.

Certain embodiments of fluids disclosed herein may directly or indirectly affect one or more components or pieces of equipment associated with the preparation, delivery, recapture, recycling, reuse, and/or disposal of the disclosed fluids. For example, and with reference to FIG. 1 the disclosed fluids may directly or indirectly affect one or more components or pieces of equipment associated with wellbore drilling assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the borehole 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the scope of the disclosure.

One or more of the disclosed fluids may be added to the drilling fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the disclosed fluids may be added to the drilling fluid 122 at any other location in the drilling assembly 100. In at least one embodiment, for example, there could be more than one retention pit 132, such as multiple retention pits 132 in series. Moreover, the retention put 132 may be representative of one or more fluid storage facilities and/or units where the disclosed fluids may be stored, reconditioned, and/or regulated until added to the drilling fluid 122.

As mentioned above, the disclosed fluids may directly or indirectly affect the components and equipment of the drilling assembly 100. For example, the disclosed fluids may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, any fluid reclamation equipment, The fluid processing unit(s) 128 may further include one or more sensors, gauges, pumps, compressors, and the like used store, monitor, regulate, and/or recondition the fluids present in certain embodiments.

The disclosed fluids may directly or indirectly affect the pump 120, which representatively includes any conduits, pipelines, trucks, tubulars, and/or pipes used to fluidically convey the fluids downhole, any pumps, compressors, or motors (e.g., topside or downhole) used to drive the fluids into motion, any valves or related joints used to regulate the pressure or flow rate of the fluids, and any sensors (i.e., pressure, temperature, flow rate, etc.), gauges, and/or combinations thereof, and the like. The disclosed fluids may also directly or indirectly affect the mixing hopper 134 and the retention pit 132 and their assorted variations. The disclosed fluids may also directly or indirectly affect the various downhole equipment and tools that may come into contact with the fluids such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The disclosed fluids may also directly or indirectly affect any downhole heat exchangers, valves and corresponding actuation devices, tool seals, packers and other wellbore isolation devices or components, and the like associated with the wellbore 116. The disclosed fluids may also directly or indirectly affect the drill bit 114, which may include, but is not limited to, roller cone bits, PDC bits, natural diamond bits, any hole openers, reamers, coring bits, etc. While not specifically illustrated herein, the disclosed fluids may also directly or indirectly affect any transport or delivery equipment used to convey the fluids to the drilling assembly 100 such as, for example, any transport vessels, conduits, pipelines, trucks, tubulars, and/or pipes used to fluidically move the fluids from one location to another, any pumps, compressors, or motors used to drive the fluids into motion, any valves or related joints used to regulate the pressure or flow rate of the fluids, and any sensors (i.e., pressure and temperature), gauges, and/or combinations thereof, and the like.

To facilitate a better understanding of the present disclosure, the following examples of certain aspects of preferred embodiments are given. The following examples are not the only examples that could be given according to the present disclosure and are not intended to limit the scope of the disclosure or claims.

EXAMPLE

To test the rheological properties of certain fluids comprising hydrophobically coated particulates of the present disclosure, samples of BARACARB® 5 and BARACARB® 25 particulates (sized ground marble particulates available from Halliburton Energy Services, Inc.) were coated with different organic acids. The organic acids tested were stearic acid, oleic acid, lauric acid, and caproic acid.

The particulates were coated by the following process. Each organic acid was dissolved in acetone solution at 1% concentration by weight. The BARACARB® particulates were mixed into the solutions and stirred at 600 rpm with a benchtop paddle mixer. The acetone was then allowed to evaporate, and the coated particles were placed in a drying oven at 200° F. overnight.

Each sample of treated particulates (as well as (1) a sample of untreated BARACARB® particulates, and (2) a sample of untreated BARACARB® particulates with 1% stearic acid dissolved in the fluid) was incorporated into a drilling fluid sample having the formulation listed in Table 1 below. The trademarked additives listed in Table 1 are available from Halliburton Energy Services, Inc.

Testing was performed on each of the fluids. The fluids were tested using a Fann 35 viscometer. Readings were taken at 600, 300, 200, 100, 6, and 3 RPM. Additionally, fluid loss was tested with an HPHT filter press. Fluid loss was measured at 250° F. and 500 PSI.

TABLE 1

| Component | Value |
| --- | --- |
| 14.2 ppg $CaBr_2$ brine, bbl | 0.923 |
| 11.6 ppg $CaCl_2$ brine, bbl | 0.077 |
| BRINEDRIL VIS ™ viscosifier, lb | 0.3 |
| N-DRIL ™ HT PLUS filtration control agent, lb | 6 |
| BARABUF ® pH buffer, lb | 3 |
| Coated or uncoated BARACARB ® 5, lb | 25 |
| Coated or uncoated BARACARB ® 25, lb | 25 |
| OXYGON ™ oxygen scavenger, lb | 1 |

Various properties of the drilling fluids were evaluated, which are reported in Table 2 below. Plastic viscosities were calculated by taking the difference in the viscosity readings at 600 rpm and 300 rpm. These data indicate that fluids comprising particulates treated with hydrophobizing agents of the present disclosure may provide improved rheological properties to the fluid.

In this example, the fluids of the present disclosure exhibited lower plastic viscosity, improved lubricity, and higher gel strength as compared to the untreated particulate drilling fluid. The fluids of the present disclosure also exhibited lower overall viscosity, improved lubricity, lower plastic viscosity as compared to the drilling fluid with stearic acid and untreated particulate. Furthermore, the fluids of the present disclosure that contained particulates treated with stearic acid, caproic acid, and oleic acid exhibited lower fluid loss than the treatment fluid that contained the untreated particulate solution.

well bore penetrating at least a portion of a subterranean formation; and using the treatment fluid to drill a portion of a wellbore.

Another embodiment of the present disclosure is a system comprising: providing a treatment fluid comprising an aqueous base fluid and at least one particulate treated with one or more hydrophobizing agents, wherein the hydrophobizing agent is a long chain fatty acid; and introducing the fluid into a wellbore penetrating at least a portion of a subterranean formation.

Another embodiment of the present disclosure is a method comprising: providing a treatment fluid comprising a brine that comprises one or more divalent salts dissolved therein, and a plurality of calcium carbonate particulates that are at least partially coated with stearic acid; introducing the fluid into a well bore penetrating at least a portion of a subterranean formation; and using the treatment fluid to drill a portion of a wellbore.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patente.

What is claimed is:

1. A method comprising:
   providing a treatment fluid comprising an aqueous base fluid;
   adding to the treatment fluid at least one particulate (i) comprising calcium carbonate and (ii) treated with a

TABLE 2

| Property | Untreated | Untreated with Stearic acid (1%) | Stearic acid | Caproic Acid | Lauric Acid | Oleic Acid |
| --- | --- | --- | --- | --- | --- | --- |
| Fann Dial Reading @ 600 rpm | 96.5 | 146 | 89 | 105.667 | 86.33 | 91.5 |
| Fann Dial Reading @ 300 rpm (cP) | 57.25 | 102 | 56.5 | 72 | 55.667 | 58.5 |
| Fann Dial Reading @ 200 rpm | 43 | 83 | 43.5 | 59.667 | 43.667 | 45 |
| Fann Dial Reading @ 100 rpm | 27.75 | 59 | 28.75 | 42 | 29.33 | 30 |
| Fann Dial Reading @ 6 rpm | 5.75 | 19 | 7.25 | 12 | 7.33 | 7 |
| Fann Dial Reading @ 3 rpm | 4 | 16 | 6 | 9.667 | 5.667 | 6 |
| Plastic Viscosity (cP) | 39.25 | 44 | 32.5 | 33.667 | 30.66 | 33 |
| Gel strength (10 s/10 m/30 m) (lb/100 $ft^2$) | 3.75/5/6 | 14/22/27 | 5/7/9.5 | 7.33/11.33/14.67 | 4.33/6.33/9 | 5/6.5/9 |
| HP/HT fluid loss @ 250° F., 500 psi (ml/30 mins) | 10.7 | 7.6 | 8.5 | 9.8667 | 10.8 | 9.8 |

An embodiment of the present disclosure is a method comprising: providing a treatment fluid comprising an aqueous base fluid and at least one particulate treated with one or more hydrophobizing agents; introducing the fluid into a hydrophobizing agent comprising one selected from the group consisting of stearic acid and lauric acid;

by adding the at least one particulate treated with the hydrophobizing agent to the treatment fluid, increasing the viscosity of the treatment fluid at a shear rate of 100 rpm or less, and decreasing the viscosity of the treatment fluid at a shear rate of 300 rpm or more;

introducing the treatment fluid into at least a portion of a wellbore penetrating at least a portion of a subterranean formation; and using the treatment fluid to drill a portion of the wellbore.

2. The method of claim 1, wherein the aqueous base fluid comprises a brine.

3. The method of claim 2, wherein the brine comprises a divalent brine.

4. The method of claim 1, wherein the treatment fluid is used to drill a portion of the wellbore that comprises a reservoir or pay zone.

5. The method of claim 1, further comprising:

forming a filter cake that comprises the at least one particulate in at least the portion of the subterranean formation; and at least partially degrading at least a portion of the filter cake using an acid or an acid generating component.

6. A method comprising:

providing a drilling fluid comprising an aqueous base fluid;

adding to the drilling fluid at least one particulate (i) comprising calcium carbonate and (ii) treated with a hydrophobizing agent comprising one selected from the group consisting of stearic acid and lauric acid;

by adding the at least one particulate treated with the hydrophobizing agent to the drilling fluid, increasing the viscosity of the drilling fluid at a shear rate of 100 rpm or less, and decreasing the viscosity of the drilling fluid at a shear rate of 300 rpm or more; and introducing the drilling fluid into a wellbore penetrating at least a portion of a subterranean formation.

7. The method of claim 6, wherein the aqueous base fluid comprises a brine.

8. A method comprising:

providing a treatment fluid comprising a divalent brine that comprises one or more divalent salts dissolved therein;

adding to the treatment fluid a plurality of calcium carbonate particulates that are at least partially coated with stearic acid;

introducing the treatment fluid into a well bore penetrating at least a portion of a subterranean formation;

by adding the plurality of calcium carbonate particulates that are at least partially coated with stearic acid to the treatment fluid, increasing the viscosity of the treatment fluid at a shear rate of 100 rpm or less, and decreasing the viscosity of the treatment fluid at a shear rate of 300 rpm or more; and using the fluid to drill a portion of the wellbore.

9. The method of claim 8, wherein the treatment fluid is used to drill a portion of the wellbore that comprises a reservoir or pay zone.

* * * * *